United States Patent
Voice et al.

(10) Patent No.: US 7,763,204 B2
(45) Date of Patent: Jul. 27, 2010

(54) MANUFACTURING PROCESS AND APPARATUS

(75) Inventors: Wayne E. Voice, Nottingham (GB); Nicholas Wain, Worcester (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 12/232,237

(22) Filed: Sep. 12, 2008

(65) Prior Publication Data
US 2009/0096123 A1 Apr. 16, 2009

(30) Foreign Application Priority Data
Oct. 15, 2007 (GB) .................. 0720058.7

(51) Int. Cl.
*B29C 43/00* (2006.01)
*B27N 3/00* (2006.01)
*B28B 1/00* (2006.01)
*A01J 21/00* (2006.01)

(52) U.S. Cl. .............. 264/604; 264/109; 264/119; 264/313; 264/319; 264/320; 264/325; 264/667; 425/405.2; 419/42; 419/49

(58) Field of Classification Search ......... 264/313, 264/109, 119, 319, 320, 325, 604, 667; 425/405.2; 419/42, 49
See application file for complete search history.

(56) References Cited

U.S. PATENT DOCUMENTS

| | | | | |
|---|---|---|---|---|
| 5,366,686 A | * | 11/1994 | Mortensen et al. | 419/5 |
| 6,214,069 B1 | * | 4/2001 | Blank et al. | 51/309 |
| 6,500,557 B1 | * | 12/2002 | Koizumi et al. | 428/469 |

FOREIGN PATENT DOCUMENTS

| | | |
|---|---|---|
| GB | 797365 | 7/1958 |
| GB | 855876 | 12/1960 |
| GB | 896360 | 5/1962 |
| GB | 905989 | 9/1962 |
| GB | 1065763 | 4/1967 |
| JP | A-56-096002 | 8/1981 |
| JP | A-61-159566 | 7/1986 |
| JP | A-02-030773 | 2/1990 |

* cited by examiner

Primary Examiner—Matthew J Daniels
Assistant Examiner—Atul Khare
(74) Attorney, Agent, or Firm—Oliff & Berridge, PLC

(57) ABSTRACT

A manufacturing process that comprises placing an article within a particulate medium (4), the article being provided with a molded body (8) of small ceramic particles. On application of heat and pressure the small ceramic particles are pushed between the particulate medium (4) to permit localized deformation of the article (2).

18 Claims, 2 Drawing Sheets

MANUFACTURING PROCESS AND APPARATUS

This invention relates to a manufacturing process and apparatus and in particular a manufacturing process involving Hot Isostatic Pressure (HIP).

According to a first aspect of the invention there is provided a manufacturing process comprising placing an article within a particulate medium, the article being provided with deforming means adjacent thereto, the deforming means permitting localised deformation of the article during application of heat and pressure to the particulate medium.

Preferably the deforming means comprise a particulate material. Preferably the particulate material of the deforming means has a smaller diameter than the particulate medium.

Preferably the localised deformation pushes at least part of the deforming means between the particulate medium, which is preferably ceramic sand.

Preferably the particulate material is enclosed within a sealed container.

Preferably the process further comprises the step of applying the deforming means to the article as a paste containing particulate material.

The heat and pressure may be applied during Hot Isostatic Pressing.

Embodiments of the invention will now be described by way of example only, with reference to the accompanying drawings, in which.

Figure 1:
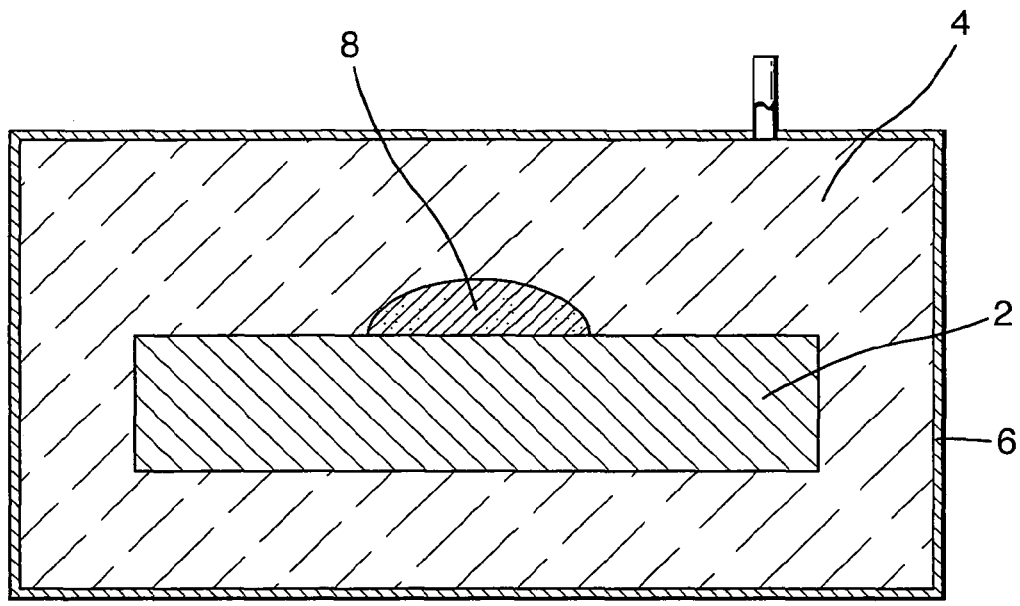
FIG. 1 depicts a schematic set up for a Hot Isostatic Press process
Figure 2:
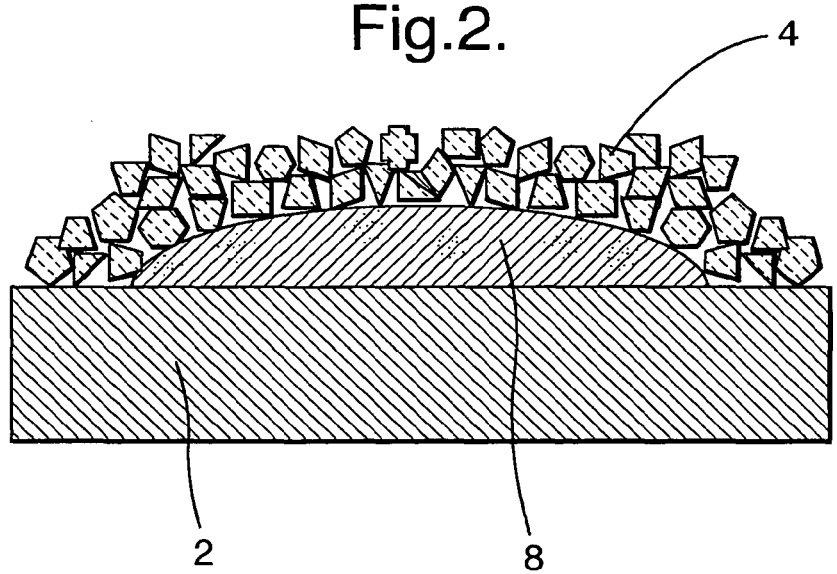
FIG. 2 depicts a close up schematic of portion A of the component of FIG. 1 prior to the application of heat and pressure.
Figure 3:
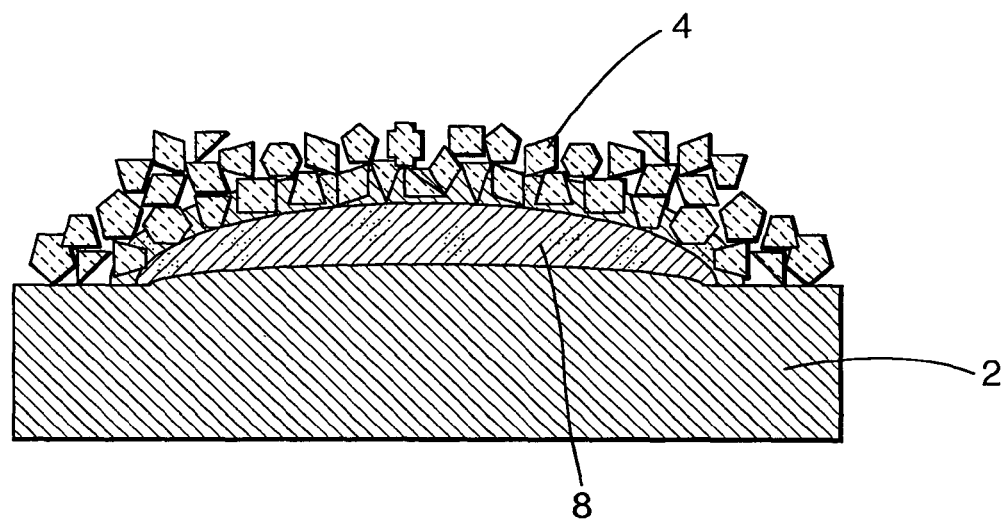
FIG. 3 depicts a close up schematic of portion A of the component of FIG. 1 following application of heat and pressure.

Referring to FIG. 1, the figure depicts an article 2 placed within a particulate material 4 enclosed by an evacuated, sealed, flexible envelope 6. The envelope 6 is placed within a HIPping chamber and heated. A pressure is applied uniformly to the exterior of the envelope and the pressure is transmitted to the component through the particulate medium 4.

The particulate medium is a ceramic with a particle size significantly larger than that of the deforming means 8, where the deforming means comprises particles. In the preferred embodiment the particles of the medium are of yttria having an average size of around 500 µm. Yttria or zirconia are preferred for most metallic materials as these will not react with the metallic materials. The invention is not limited to these materials as the skilled person will be aware that others will suffice.

The envelope 6 is preferably of mild steel however it may be of any other appropriate material and form as conventionally used in the field.

The article 2 is preferably metallic or a metallic alloy. In the preferred embodiment the article is formed of a Titanium, Nickel or Iron alloy. Alloys of these materials may be used in gas turbine engines for casings, combustors, aerofoils or other components.

A paste 8 is applied to the article at a desired location and provides the deforming means. The paste preferably comprises a powder or particulate material dispersed in a liquid which is moulded to a desired shape and then allowed to air dry. In the preferred embodiment the particles of the particulate material are aluminium silicate having a particle size of around 1 µm. Such a powder may be commonly found as a firebrick cement based generally on aluminium/sodium silicate. It is preferable that the particles are not secured together, as through placing in a binder and curing, as this limits their portability through the Hipping medium 4.

A conventional HIPping pressure of about 100 MPa is applied to the envelope at a temperature of around 900 to 1000° C. for about 4 hours.

The presence of the paste on the article provides a region where the article can be deformed without substantial change to its overall form.

When the vacuum packed assembly is Hot Isostatically pressed the dried ceramic particles of the paste are slowly pressed between the larger particles of the ceramic sand or HIPping powder i.e. the particulate medium. The ceramic sand is formed of irregular shaped particles which interlock with each other locally and are prevented from shifting. As the ceramic paste intersperses into the ceramic sand it is replaced by material extruded from the article, which is relatively plastic when heated, immediately adjacent the paste thus causing a morphological change in the article. Because of the Isostatic pressure the extruded material is accommodated over a broad section so that the overall component shape is generally maintained apart from the localised extrusion. The extruded zone is microstructurally homogeneous with the bulk of the article.

Both the ceramic particle paste and the irregular ceramic particle sand should preferably be of a suitable composition so that they are relatively inert to each other and to the component alloy. Using HIPping particles that are of an equivalent size to the particles of the deformation means can reduce and effectively eliminate the extrusion effect. This is primarily because the deformation means particles cannot enter the interstices between the HIPping medium particles. Similarly, using HIPping medium particles that are smooth also reduces the localised extrusion of the article. The smooth particles can rotate and slide relative to each other which inhibits movement of the deformation means particles into the interstices of the HIPping medium particles 4.

Figure 4:
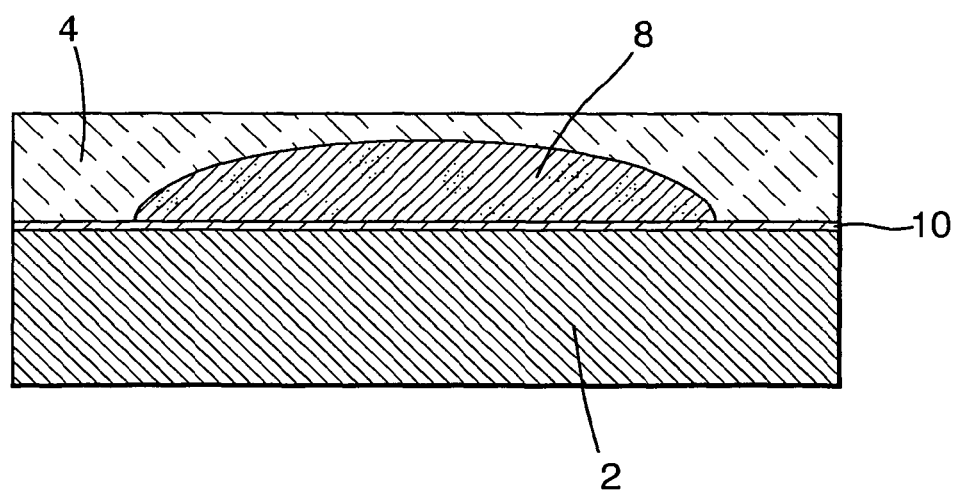
FIG. 4 depicts an alternative embodiment of the method

It can be desirable to provide a thin flexible foil 10 between the article and the paste as shown in FIG. 4. This feature has the beneficial effect of ensuring the small particles of the deforming means 8 are not embedded in the article. The foil also makes it easier to remove the "reaction zone" which is the area of the irregular particles in which the smaller particles of the deformation means are consolidated. Without the foil it is necessary to chip or remove this using a jet or other mechanical means.

Beneficially, the outward extrusion means that surface cracks or other defect can be removed from a component surface by extruding the crack or defect outwardly from where it can be dressed out by grinding, polishing or other appropriate means.

Beneficially, the outward extrusion of the article surface means that protruding features can be added to parts more cheaply manufactured to a simpler geometric shape, such as cylindrical or conical flow formed section. Protruding features such as bosses, landing platforms, flanges or brackets increase the complexity and cost of a part if formed by machining. Advantageously, the invention permits greatly reduced component cost, material usage and machining time. Features can be added without compromising material quality through the use of welded joints or the like.

As a further advantage the invention permits the addition of identification or surface relief to components normally processed by HIPping in a particulate medium.

We claim:

1. A manufacturing process comprising:
   placing an article within a particulate medium, the article being provided with deforming means adjacent only to a portion of the article, the deforming means permitting localized deformation;
   applying heat and pressure to the particulate medium to force at least part of the deforming means into the particulate medium and produce localized extrusion of the article into the region previously occupied by the deforming means substantially only where the article is adjacent to the deforming means.

2. A process according to claim 1, wherein the deforming means comprise a particulate material.

3. A process according to claim 2, wherein the particulate material of the deforming means have a smaller average size than the particles of the particulate medium.

4. A process according to claim 1, wherein the particulate medium is ceramic sand.

5. A process according to claim 1, wherein the particulate medium is enclosed within a sealed container.

6. A process according to claim 1, further comprising the step of applying the deforming means to the article as a paste containing particulate material.

7. A process according to claim 1, wherein the heat and pressure is applied during Hot Isostatic Pressing.

8. A process according to claim 1, wherein the article is provided with a sacrificial foil against which the deforming means is located.

9. A manufacturing process, comprising:
   inserting an article into a particulate medium such that a first exterior portion of the article contacts the particulate medium;
   disposing a paste adjacent a second exterior portion of the article; and
   applying heat and pressure to the particulate medium to cause at least a portion of the second exterior portion of the article to deform by extrusion, wherein the application of heat and pressure forces at least a part of the paste into the particulate medium.

10. A process according to claim 9, wherein the article substantially maintains its shape.

11. A process according to claim 9, wherein the second exterior portion of the article is not in direct contact with the particulate medium.

12. A process according to claim 9, wherein the paste comprises a particulate material.

13. A process according to claim 12, wherein the particulate material of the paste have a smaller average size than particles of the particulate medium.

14. A process according to claim 9, wherein the localized deformation of the article causes deformation at least at part of the particulate medium.

15. A process according to claim 9, wherein the particulate medium is ceramic sand.

16. A process according to claim 1, wherein the particulate medium is enclosed within a sealed container.

17. A process according to claim 9, wherein the heat and pressure is applied during Hot Isostatic Pressing.

18. A process according to claim 9, wherein the article is provided with a sacrificial foil against which the paste is located.

* * * * *